United States Patent [19]

Kato et al.

[11] 3,954,935
[45] May 4, 1976

[54] PROCESS FOR PREPARING REINFORCED PLASTIC PLATES

[75] Inventors: Hisashi Kato; Takuya Goto; Yasuo Hayashi; Wataru Kajihara; Hiroshi Taniguti, all of Wakayama, Japan

[73] Assignee: Kao Soap Co., Ltd., Tokyo, Japan

[22] Filed: Oct. 10, 1974

[21] Appl. No.: 513,643

[30] Foreign Application Priority Data
Oct. 12, 1973  Japan.............................. 48-114514

[52] U.S. Cl................................ 264/251; 264/236; 264/258; 264/267
[51] Int. Cl.²..................... B29C 25/00; B29D 3/00; B32B 31/00
[58] Field of Search ........... 264/229, 231, 138, 139, 264/257, 274, 235, 236, 346, 347, 258, 265, 251, 267

[56] References Cited
UNITED STATES PATENTS

| | | | |
|---|---|---|---|
| 2,427,144 | 9/1947 | Jansen | 264/274 |
| 2,769,742 | 11/1956 | Helbing | 264/255 |
| 2,897,546 | 8/1959 | Clapp et al. | 264/346 |
| 3,179,726 | 4/1965 | Perry | 264/286 |
| 3,288,899 | 11/1966 | Angioletti | 264/236 |
| 3,501,564 | 3/1970 | Snoeyenboh et al. | 264/255 |
| 3,789,102 | 1/1974 | Hazelett, Jr. | 264/313 |

*Primary Examiner*—Robert E. White
*Assistant Examiner*—James B. Lowe
*Attorney, Agent, or Firm*—Woodhams, Blanchard and Flynn

[57] ABSTRACT

A process for preparing reinforced plastic plates comprising molding a thermosetting resin in a mold to form a plate-like body, forming spaced-apart slits extending in the longitudinal direction of the plate-like body with a spacing distance of 1 m at the most just after setting of the resin, suspending the plate-like body from one longitudinal end thereof, fixing a weight to the lower portion of the plate-like body, confining the plate-like body in the horizontal direction by at least one pair of fixing boards, heat-curing the plate-like body in the said state, and embedding an elastic resin in said slit portions of the plate-like body.

8 Claims, 3 Drawing Figures

PROCESS FOR PREPARING REINFORCED PLASTIC PLATES

BACKGROUND OF THE INVENTION

1. Field of the Invention

This invention relates to a process for preparing reinforced plastic plates. More particularly, this invention relates to a process for preparing reinforced plastic plates made of thermosetting resin in which the heat-curing of the resin is conducted under specific conditions such that the plate does not undergo major warpage after molding.

2. Description of the Prior Art

Because of their excellent characteristics such as high corrosion resistance, light weight and high heat resistance, plates made of reinforced plastics have heretofore been used as collecting electrodes of electrostatic precitators and the like. However, in the case of large-size flat plates, the prevention of warping of the plates after they are molded has been an important problem, and various methods for preventing warping have been proposed. For example, there are generally employed a method in which a molded plate is heat-cured while it is held between two flat plates or a method in which there is used a resin of low shrinkability formed by incorporating a filler into the resin. However, these methods are unsatisfactory. More specifically, the former method is suitable for molding relatively small plates, but in the case of large plates, for example, a plate having length and width dimensions each of more than 1 m, the occurrence of warping in the central portion of the plate cannot be prevented. In the latter method, the corrosion resistance of the plate is degraded by incorporation of the filler and satisfactory effects cannot be obtained.

SUMMARY OF THE INVENTION

In accordance with this invention, there is provided a process for preparing reinforced plastic plates comprising molding a thermosetting resin in a mold to form a plate-like body, forming a plurality of spaced-apart slits in the platelike body extending in the longitudinal direction of said body and with the slits being spaced-apart a maximum distance of 1 m just after setting of the resin, suspending the thus-formed plate-like body from one longitudinal end thereof, fixing a weight to the lower portion of the plate-like body, confining the plate-like body in the horizontal direction by at least one pair of fixing boards, heat-curing the plate-like body in the said state, and embedding an elastic resin in said slit portions of the plate-like body. Plates prepared according to the process of this invention are characterized in that warps are scarcely formed. Therefore, they can be effectively employed in the construction of precision machines, for example, as collecting electrodes of electrostatic precipitators.

The word "setting" means semi-curing in the specification. After the plate-like body is thermoset, it can be released from the mold and handled. But, it has not been cured completely. While, the word "curing" means completely curing for after-treatment.

Any molds for forming reinforced plastic plates can be used in the process of this invention. As the thermosetting resin, there are preferably employed unsaturated polyester resins, epoxy resins and furan resins. As in the case of conventional reinforced plastic molded articles, inorganic fibers such as glass fibers and asbestos fibers and organic fibers such as nylon, polyester and acrylic fibers are employed as reinforcing fibers. Also as in the case of conventional reinforced plastic molded articles, carbon powder, carbon fiber and the like can be employed to render the molded products electrically conductive. As the elastic resin to be embedded in the slits, there are preferably employed polyurethane elastomers, flexible unsaturated polyester resins and silicone rubbers, but other elastomer materials can be used optionally depending on the intended use of the product plates.

It is preferred that the weight to be attached to the lower end of the plate-like body for hanging the plate-like body weighs from 0.5 to 1 Kg per $cm^2$ of the cross-sectional area of the plate-like body and is effective to exert tension on said plate without tearing thereof. In that range the warp-preventing effect increases with an increase of the weight and a sufficient effect can be obtained when the weight is 0.5 $Kg/cm^2$ or heavier. However, no particular improved effect can be obtained when the weight exceeds 1 $Kg/cm^2$, and handling of the weight becomes troublesome. Accordingly, the above weight range is preferred.

It is critical that the maximum spacing of slits formed in the plate-like body is 1 m. If the spacing distance of the slits exceeds 1 m, a sufficient warp-preventing effect cannot be obtained. The minimum spacing of the slits is not critical, so long as the sheet retains its structural integrity during curing of the resin. A minimum spacing of 500 mm is satisfactory. The width of the slits is not critical and widths in the range of 3 to 6 mm are satisfactory. It is preferred that the slits are formed in parallel with each other and that they extend vertically from and between points spaced about 20 cm from both of the ends of the plate-like body, but the arrangement of the slits is not limited to this embodiment. It is usually preferred that slits are formed, as by cutting the plate-like body, just after setting of the plate-like body, but it is also possible to mold a plate-like body and simultaneously form the slits therein.

Example

Figures 1, 2:
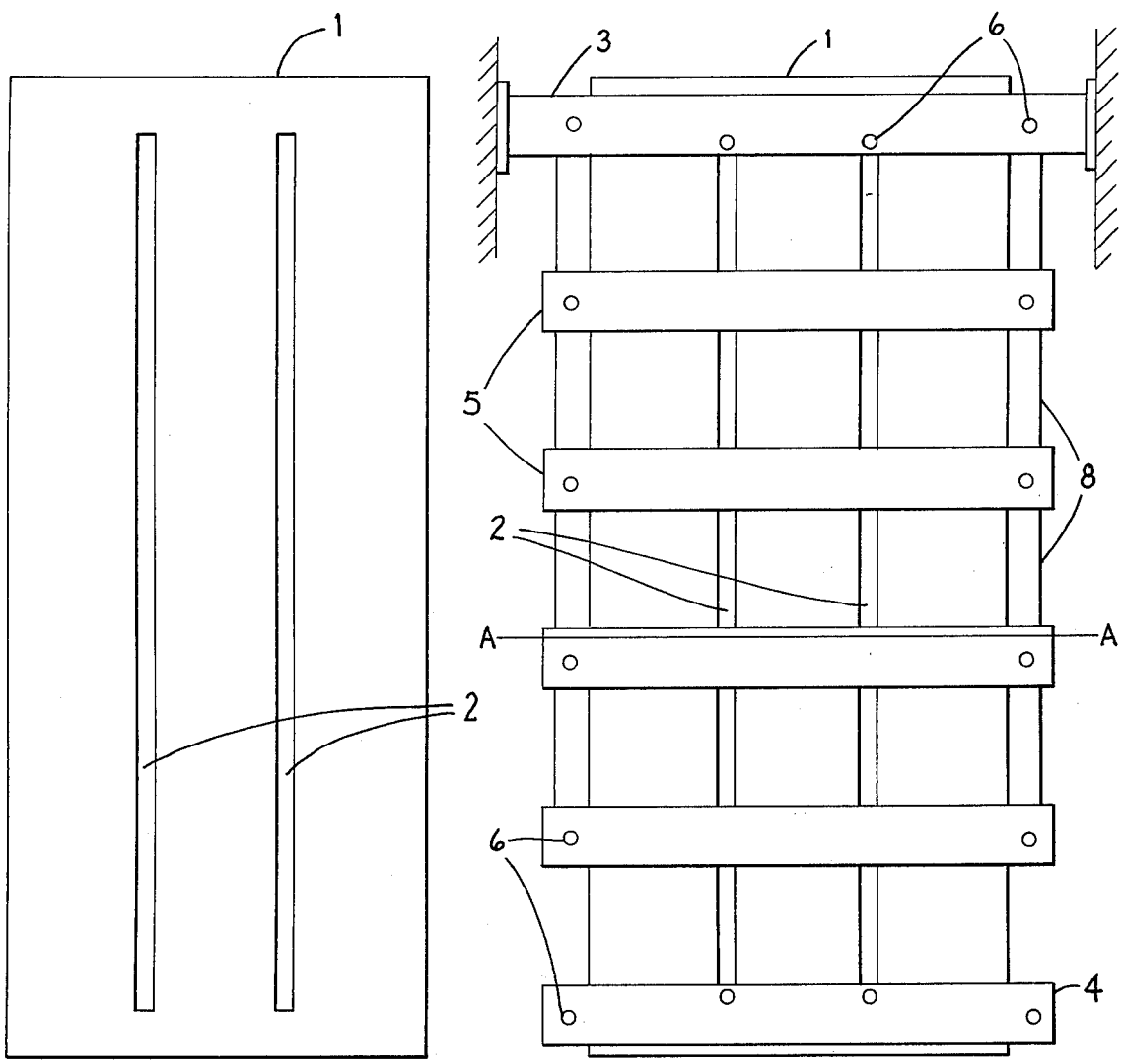
FIG. 1 is a front view of the plate product.
FIG. 2 is a schematic front view of the plate and the apparatus for supporting same during curing of the resin.
Figure 3:
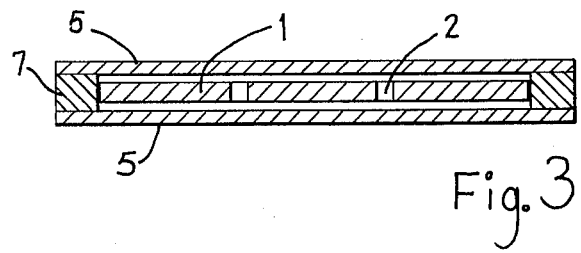
FIG. 3 is a sectional view taken along the line A—A in FIG. 2.

A flat plate having a length of 5 m, a width of 3 m and a thickness of 2.5 mm was prepared by a conventional laminating method from a molding composition comprising an unsaturated polyester resin containing mixed therein 20 weight percent of carbon powder, 2 sheets of chopped strand glass fiber mats having a unit weight of 450 $g/cm^2$ and 2 sheets of carbon fiber mats having a unit weight of 30 $g/m^2$. As shown in FIG. 1, two through slits 2, both having a width of 5 mm, were formed in the flat plate 1 so that the slits extended in the longitudinal direction of said plate and the slits were spaced-apart a distance of 1 m. Then, as shown in FIG. 2, the plate 1 was suspended vertically from adjacent one longitudinal end thereof by supporting the upper portion of same on a fixing board 3 by means of bolts 6 which passed through the slits 2 so that the upper edges of the slits rested on the bolts. The lower portion of the plate was clamped by a weighted board 4. At vertically spaced intervals the plate 1 was confined against major horizontal movement by 4 pairs of fixing boards 5 which pairs were vertically spaced a distance of 1 m from one another. As shown in FIG. 3, spacers 7, having a thickness larger by about 3 mm than that of the plate 1, were inserted between the ends of each of the pairs of fixing boards 5, and hence, the plate 1 was suspended loose with respect to the fixing boards 5. All the pairs of fixing boards 5 were connected to each other by ropes 8 and were suspended thereby. In this state, heat-curing was conducted at 80°C for 3 hours, and then the plate 1 was taken out of the apparatus and a polyurethane elastomer was embedded into the slits. The maximum warp was 2 mm in the resulting plate.

When a plate was prepared by hanging a plate, without forming slits therein, fixing it with the fixing boards 5 and the board weight 4 and conducting the heat-curing at 80°C for 3 hours, the maximum warp was 10 mm.

The warp of the plate was determined by hanging the plate, hanging down several vertical lines (so-called plumb lines) along the surface of the plate and spaced therefrom, and measuring the distance between the vertical lines and the plate.

The embodiments of the invention in which an exclusive property or privilege is claimed are defined as follows:

1. A process for preparing a completely cured, reinforced, thermosetting resin plate, comprising the steps of:

suspending in a vertical orientation an elongated, semi-cured, reinforced, thermosetting resin plate by supporting said plate only at a position adjacent the upper end thereof so that the remainder of said plate hangs vertically downwardly from said position, said plate having a length and width both of greater than 1 meter and having a plurality of lengthwise extending parallel slits therethrough beginning at a location close to the upper end of said plate and ending at a location close to the lower end of the plate, said slits each having a width of from 3 to 6 mm and adjacent slits being laterally spaced from each other a distance of from 500 millimeters to one meter;

attaching a weight only to the lower end of said suspended plate wherein said weight is from 0.5 to 1.0 Kg per cm$^2$ of the cross-sectional area of said plate and is effective to exert tension on said plate without causing tearing thereof;

suspending in a vertical orientation a framework so that said framework hangs downwardly from a location the upper end of said plate and is disposed between the position of suspension of said plate and said weight, said framework comprising a plurality of pairs of fixing members disposed in opposing, closely spaced relationship to the surfaces of said plate, the respective pairs of plates being vertically spaced-apart from each other, the fixing members of each pair being located on opposite sides of said plate and being spaced therefrom a small distance to limit horizontal movement of said plate;

heating said suspended plate to completely cure said resin while said weight is attached to said plate and said framework is associated therewith; then removing the framework and weight from said plate; and then filling said slits in said plate with an elastomer.

2. A process as claimed in claim 1, wherein the position of suspension of said plate is at the upper ends of said slits.

3. A process as claimed in claim 1, wherein said slits are parallel to the side edges of the plate.

4. A process as claimed in claim 1 in which the thermosetting resin plate is a molded fiber-reinforced resin plate comprising mats of fibers laminated to said resin.

5. A process as claimed in claim 4, in which said resin consists essentially of polyester resin having carbon powder mixed therein, said mats comprise at least one glass fiber mat and at least one carbon fiber mat and said elastomer is polyurethane elastomer.

6. A process as claimed in claim 1, in which said pairs of fixing members are secured to each other with spacer means being interposed therebetween and located outside of the vertical side edges of said plate, with said spacer means having a thickness greater than the thickness of said plate, with said plate being spaced from said fixing members and said spacer means, and wherein said pairs of fixing members are supported by elongatd flexible elements.

7. A process as claimed in claim 6, in which said elongated flexible elements extend downwardly from a position adjacent the position of suspension of said plate.

8. A process as claimed in claim 1, in which said fixing members have smooth surfaces facing the surfaces of said plate.

* * * * *

UNITED STATES PATENT AND TRADEMARK OFFICE
CERTIFICATE OF CORRECTION

PATENT NO. : 3 954 935
DATED : May 4, 1976
INVENTOR(S) : Hisashi Kato et al

It is certified that error appears in the above–identified patent and that said Letters Patent are hereby corrected as shown below:

Column 4, line 3; correct "location the" to read

---location adjacent the---.

Signed and Sealed this

Twenty-fourth Day of August 1976

[SEAL]

Attest:

RUTH C. MASON
Attesting Officer

C. MARSHALL DANN
Commissioner of Patents and Trademarks